US010764368B2

(12) United States Patent
Romem et al.

(10) Patent No.: US 10,764,368 B2
(45) Date of Patent: Sep. 1, 2020

(54) SYSTEM AND METHOD FOR PROVIDING DATA REDUNDANCY FOR REMOTE DIRECT MEMORY ACCESS STORAGE DEVICES

(71) Applicant: Excelero Storage Ltd., Tel Aviv (IL)

(72) Inventors: Yaniv Romem, Jerusalem (IL); Ofer Oshri, Kfar Saba (IL); Omri Mann, Jerusalem (IL); Daniel Herman Shmulyan, Beer Yaaqov (IL)

(73) Assignee: Excelero Storage Ltd., Tel Aviv (IL)

( * ) Notice: Subject to any disclaimer, the term of this patent is extended or adjusted under 35 U.S.C. 154(b) by 82 days.

(21) Appl. No.: 15/584,551

(22) Filed: May 2, 2017

(65) Prior Publication Data
US 2017/0324814 A1    Nov. 9, 2017

Related U.S. Application Data

(60) Provisional application No. 62/331,397, filed on May 3, 2016.

(51) Int. Cl.
*H04L 29/08* (2006.01)
*H04L 29/06* (2006.01)
*G06F 13/28* (2006.01)

(52) U.S. Cl.
CPC .......... *H04L 67/1097* (2013.01); *G06F 13/28* (2013.01); *H04L 67/42* (2013.01)

(58) Field of Classification Search
CPC ...... H04L 67/1097; H04L 67/42; G06F 13/28
USPC ....................................................... 709/213
See application file for complete search history.

(56) References Cited

U.S. PATENT DOCUMENTS

| | | | | |
|---|---|---|---|---|
| 5,546,579 A * | 8/1996 | Josten | ................ | G06F 9/52 700/5 |
| 6,247,099 B1 * | 6/2001 | Skazinski | ........... | G06F 12/0815 711/117 |
| 6,950,945 B2 * | 9/2005 | Pfister | .................... | G06F 9/526 718/104 |
| 7,246,187 B1 * | 7/2007 | Ezra | ........................ | G06F 9/526 710/200 |
| 7,437,360 B1 * | 10/2008 | Chitre | ................ | G06F 17/30171 |
| 7,587,558 B1 * | 9/2009 | Smith | .................. | G06F 3/0622 711/114 |
| 7,730,258 B1 * | 6/2010 | Smith | .................. | G06F 3/0622 711/114 |

(Continued)

*Primary Examiner* — Abdullahi E Salad
(74) *Attorney, Agent, or Firm* — M&B IP Analysts, LLC (57) ABSTRACT

A system and method for providing data redundancy. The method includes receiving a write instruction, the write instruction including data to be written to a primary remote direct access (RDMA) storage and a primary block address corresponding to a designated primary block of the primary RDMA storage, wherein the designated primary block is associated with a primary lock stored in the primary RDMA storage; determining whether the primary lock and at least one secondary lock are obtained, wherein each secondary lock is associated with a secondary block of a distinct secondary RDMA storage; and writing the data included in the write instruction to the designated primary data block and each secondary data block associated with the obtained at least one secondary lock, when it is determined that the primary lock and the at least one secondary lock have been obtained.

19 Claims, 4 Drawing Sheets

(56) References Cited

U.S. PATENT DOCUMENTS

| | | | | |
|---|---|---|---|---|
| 7,734,604 B1 * | 6/2010 | Sinclair | | G06F 16/2343 |
| | | | | 707/704 |
| 7,822,728 B1 * | 10/2010 | Chandler | | G06F 16/1774 |
| | | | | 707/704 |
| 7,844,584 B1 * | 11/2010 | Griess | | G06F 17/30171 |
| | | | | 707/668 |
| 8,001,580 B1 * | 8/2011 | Hyer, Jr. | | G06F 16/1774 |
| | | | | 726/2 |
| 8,015,355 B1 * | 9/2011 | Smith | | G06F 12/14 |
| | | | | 711/114 |
| 8,180,961 B1 * | 5/2012 | Jiang | | H04L 67/1097 |
| | | | | 711/113 |
| 8,676,851 B1 * | 3/2014 | Nesbit | | G06F 17/30227 |
| | | | | 707/791 |
| 8,775,718 B2 | 7/2014 | Kanevsky et al. | | |
| 8,862,561 B1 * | 10/2014 | Nesbit | | G06F 17/30348 |
| | | | | 707/698 |
| 8,868,530 B1 * | 10/2014 | Thoppal | | G06F 3/0622 |
| | | | | 707/704 |
| 8,930,333 B1 * | 1/2015 | Prince | | G06F 17/30171 |
| | | | | 707/704 |
| 9,118,698 B1 * | 8/2015 | Radovanovic | | H04L 67/1097 |
| 9,164,702 B1 * | 10/2015 | Nesbit | | G06F 3/067 |
| 9,213,717 B1 * | 12/2015 | Pawar | | G06F 16/1774 |
| 2003/0220943 A1 * | 11/2003 | Curran | | G06F 16/10 |
| 2003/0221124 A1 * | 11/2003 | Curran | | H04L 63/10 |
| | | | | 726/12 |
| 2004/0205066 A1 * | 10/2004 | Bhattacharjee | | G06F 16/2343 |
| 2006/0101081 A1 * | 5/2006 | Lin | | G06F 17/30362 |
| 2010/0083247 A1 * | 4/2010 | Kanevsky | | G06F 13/28 |
| | | | | 718/1 |
| 2011/0289263 A1 * | 11/2011 | McWilliams | | G06F 12/0284 |
| | | | | 711/103 |
| 2014/0089346 A1 * | 3/2014 | Li | | G06F 17/30215 |
| | | | | 707/781 |
| 2014/0122718 A1 * | 5/2014 | Thoppai | | G06F 9/52 |
| | | | | 709/225 |
| 2015/0120925 A1 * | 4/2015 | Das | | G06F 16/1774 |
| | | | | 709/225 |
| 2015/0278291 A1 * | 10/2015 | Grosman | | G06F 17/30362 |
| | | | | 707/704 |
| 2015/0350318 A1 * | 12/2015 | Van Assche | | H04L 67/1095 |
| | | | | 709/202 |
| 2016/0154817 A1 * | 6/2016 | Mason, Jr. | | G06F 16/1827 |
| | | | | 707/704 |
| 2016/0285971 A1 * | 9/2016 | Bilas | | H04L 67/1097 |
| 2016/0378713 A1 * | 12/2016 | Kaimalettu | | G06F 15/17331 |
| | | | | 709/212 |

* cited by examiner

SYSTEM AND METHOD FOR PROVIDING DATA REDUNDANCY FOR REMOTE DIRECT MEMORY ACCESS STORAGE DEVICES

CROSS-REFERENCE TO RELATED APPLICATIONS

This application claims the benefit of U.S. Provisional Application No. 62/331,397 filed on May 3, 2016, the contents of which are hereby incorporated by reference.

TECHNICAL FIELD

The present disclosure relates generally to data redundancy storage devices, and more specifically to network accessible storage devices providing data redundancy.

BACKGROUND

As computing technology has become ubiquitous in everyday life, so too has the need for storing data created or used by computers for various tasks. As a result, many improved storage solutions have been developed. Among such solutions are storage devices including a combination of a network controller and a single storage element such as a solid-state drive (SSD). These storage devices provide remotely accessible and sharable block storage. Each device is typically a single component and may be accessed to obtain data stored therein.

To facilitate availability of stored in storage devices, solutions for providing data redundancy across multiple devices have been developed. However, these redundancy solutions face challenges in maintaining data integrity by ensuring atomicity, consistency, isolation, durability, and other properties of the data. Further, these redundancy solutions may require implementation of third party software and/or hardware for providing redundancy. As a result, these solutions face challenges in cost-effectiveness, scalability, and flexibility in adapting to specific requirements of client servers (e.g., service level agreements or other requirements that must be adhered to by client storages).

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing data redundancy. The method comprises: receiving a write instruction, the write instruction including data to be written to a primary remote direct access (RDMA) storage and a primary block address corresponding to a designated primary block of the primary RDMA storage, wherein the designated primary block is associated with a primary lock stored in the primary RDMA storage; determining whether the primary lock and at least one secondary lock are obtained, wherein each secondary lock is associated with a secondary block of a distinct secondary RDMA storage; and writing the data included in the write instruction to the designated primary data block and each secondary data block associated with the obtained at least one secondary lock, when it is determined that the primary lock and the at least one secondary lock have been obtained.

Certain embodiments disclosed herein also include a non-transitory computer readable medium having stored thereon causing a processing circuitry to execute a process, the process comprising: receiving a write instruction, the write instruction including data to be written to a primary remote direct access (RDMA) storage and a primary block address corresponding to a designated primary block of the primary RDMA storage, wherein the designated primary block is associated with a primary lock stored in the primary RDMA storage; determining whether the primary lock and at least one secondary lock are obtained, wherein each secondary lock is associated with a secondary block of a distinct secondary RDMA storage; and writing the data included in the write instruction to the designated primary data block and each secondary data block associated with the obtained at least one secondary lock, when it is determined that the primary lock and the at least one secondary lock have been obtained.

Certain embodiments disclosed herein also include a system for providing data redundancy. The system comprises: a primary remote direct memory access (RDMA) storage, wherein the primary RDMA storage stores a plurality of primary blocks and a plurality of primary locks, wherein each primary lock is associated with at least one of the plurality of primary blocks; at least one secondary RDMA storage, wherein each secondary RDMA storage stores a plurality of secondary blocks and a plurality of secondary locks, wherein each secondary lock is associated with at least one of the plurality of secondary blocks; a processing circuitry; and a memory, the memory containing instructions that, when executed by the processing circuitry, configure the system to: receive a write instruction, the write instruction including data to be written to the primary RDMA storage and a primary block address corresponding to a designated primary block of the plurality of primary blocks; determine whether the primary lock associated with the designated primary block and at least one secondary lock are obtained, wherein each secondary lock is associated with a secondary block of a distinct secondary RDMA storage of the at least one secondary RDMA storage; and write the data included in the write instruction to the primary block and each secondary block associated with the obtained at least one secondary lock, when it is determined that the primary lock and the at least one secondary lock have been obtained.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing data redundancy in remote direct memory access (RDMA) storages. A write instruction directed at a first memory of a primary RDMA storage is received. The write instruction includes data and a primary block address corresponding to at least one block of the primary RDMA storage. Each block of the primary RDMA storage is a data block associated with a primary lock. The data of the write instruction is written to the primary block address when it is determined that the primary lock and at least one secondary lock are obtained. Each secondary lock is associated with a secondary block address of a secondary RDMA storage.

Figure 1:
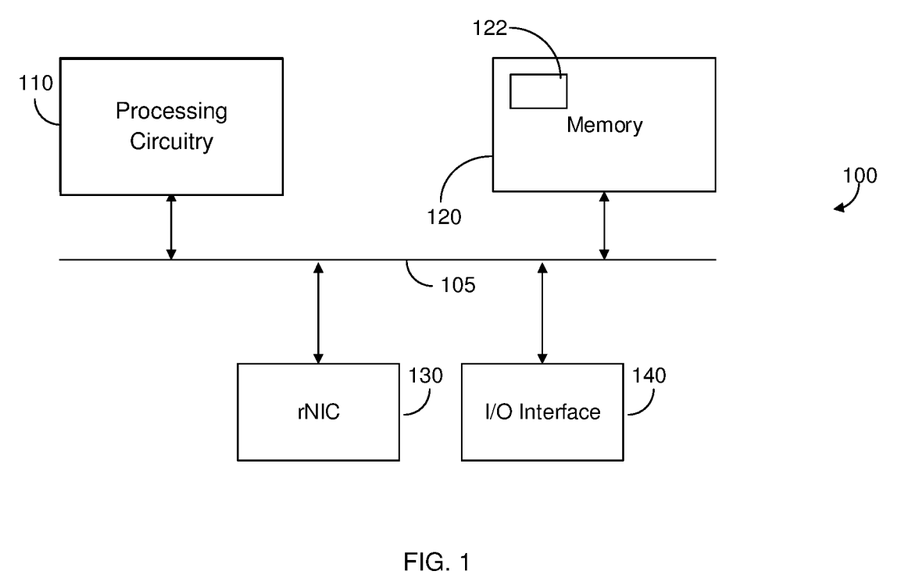
FIG. 1 is a schematic illustration of a client device for accessing a redundant remote direct memory access storage of a server.
Figure 2:
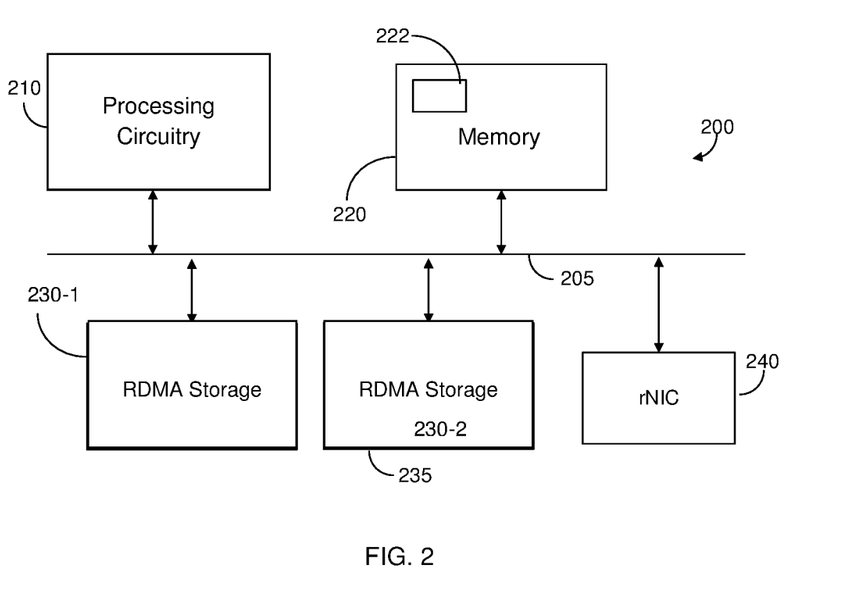
FIG. 2 is a schematic illustration of a server for providing access to a redundant remote direct memory access storage.

FIG. 1 is an example schematic illustration of a client device 100 for accessing a data redundant remote direct memory access (RDMA) storage (e.g., the RDMA storage 300, FIG. 3) of a server (e.g., the server 200, FIG. 2). The client device 100 includes a processing circuitry 110 coupled to a memory 120, a RDMA-enabled network interface controller (rNIC) 130, and an input/output (I/O) interface 140.

The processing circuitry 110 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 120 may be volatile (e.g., RAM, etc.), non-volatile (e.g., ROM, flash memory, etc.), or a combination thereof. In one configuration, the memory 120 stores software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 110, configure the processing circuitry 110 to at least access a RDMA storage of a server. The memory 120 may further be used as a working scratch pad for the processing circuitry 110, a temporary storage, and the like.

Figure 4:
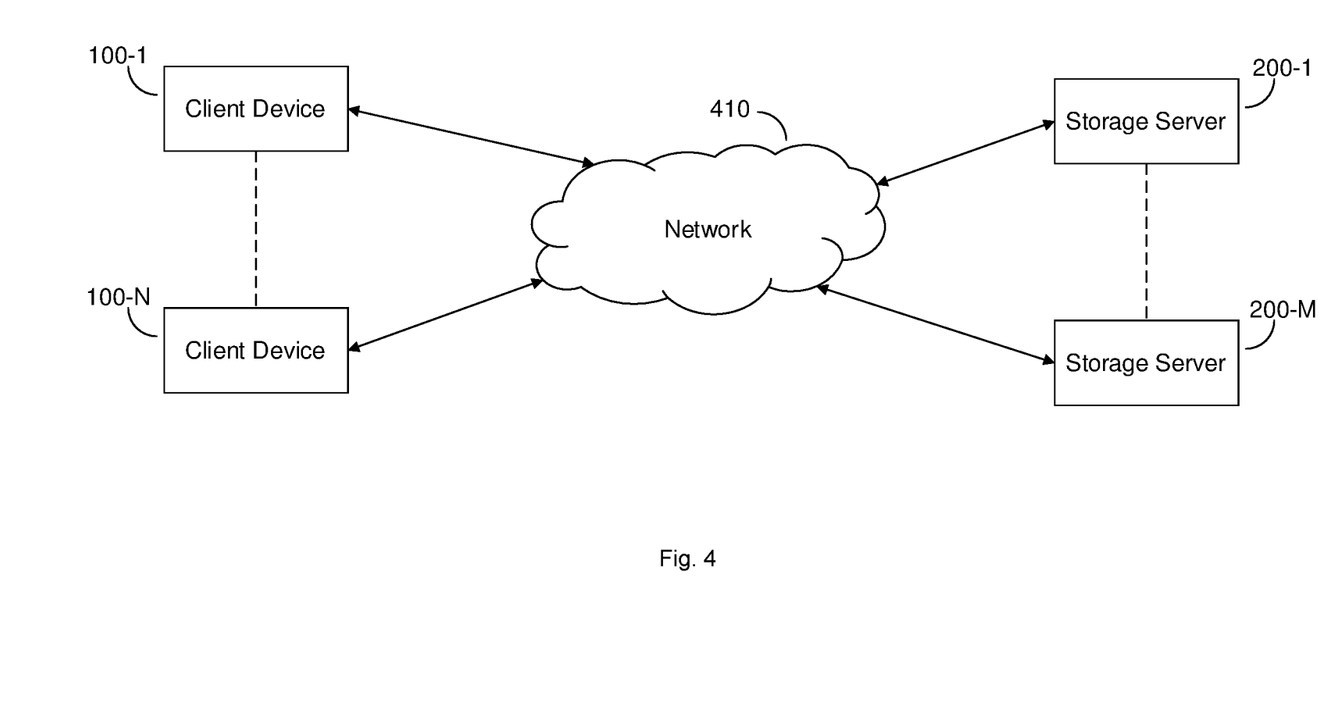
FIG. 4 is a network diagram utilized to describe various disclosed embodiments.

The rNIC 130 is configured to provide access to RDMA storages via a network (e.g., the network 410, FIG. 4). Specifically, the rNIC 130 may be configured to send write instructions, to obtain primary locks, to obtain secondary locks, or a combination thereof. The I/O interface 140 may be configured to receive inputs from, send outputs to, or both, one or more peripheral devices (not shown) such as, but not limited to, a mouse, a keyboard, a touchscreen, a display, a printer, a combination thereof, and the like.

Figure 3:
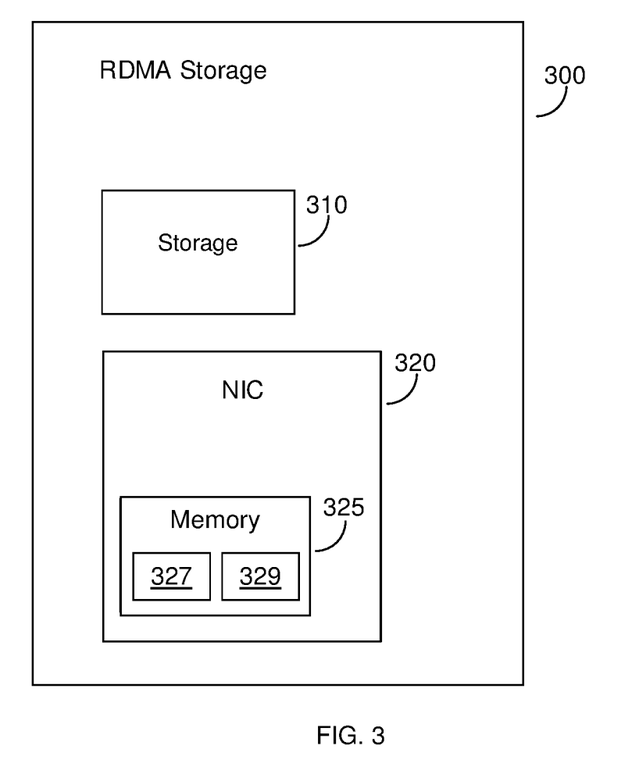
FIG. 3 is a schematic illustration of a remote direct memory access storage according to an embodiment.

FIG. 2 is an example schematic illustration of a server 200 for providing access to a data redundant remote direct memory access storage (e.g., the RDMA storage 300, FIG. 3). The server 200 includes a processing circuitry 210 coupled to a memory 220, a first RDMA storage 230-1, a second RDMA storage 230-2, and a RDMA-enabled network interface controller (rNIC) 240. In the example schematic illustration shown in FIG. 2, the RDMA storage 230-1 acts as a primary RDMA storage, and the RDMA storage 230-2 acts as a secondary RDMA storage.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 220 may be volatile (e.g., RAM, etc.), non-volatile (e.g., ROM, flash memory, etc.), or a combination thereof. In one configuration, the memory 220 stores software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 210, configure the processing circuitry 210 to at least access a RDMA storage of a server. The memory 220 may further be used as a working scratch pad for the processing circuitry 210, a temporary storage, and the like.

Each of the primary RDMA storage 230-1 and the secondary RDMA storage 230-2 may store data in a plurality of data blocks and has a plurality of block addresses, with each block address corresponding to one of the data blocks. Each block of the primary RDMA storage is associated with a respective primary lock and each block of the secondary RDMA storage 230-2 is associated with a respective primary lock. Each lock is stored in a respective RDMA storage 230 and is associated with one or more blocks of the respective RDMA storage 230. An example RDMA storage is described further herein below with respect to FIG. 3.

The rNIC 240 is configured to provide access to the RDMA storages 230 by client devices (e.g., the client device 100, FIG. 1) via a network (e.g., the network 410, FIG. 4). Specifically, the rNIC 130 may be configured to send write instructions, to obtain primary locks, to obtain secondary locks, or a combination thereof.

It should be noted that a single secondary RDMA storage 230-2 is shown in FIG. 2 merely for simplicity purposes and without limiting the disclosed embodiments. A plurality of secondary RDMA storages may be equally utilized without departing from the scope of the disclosure. The secondary RDMA storages may each be implemented as part of another server (e.g., each secondary RDMA storage may be implemented as part of one of the servers 200-1 through 200-M, FIG. 4). When a plurality of secondary RDMA storages are used, one or more of them may be implemented in any one or more servers.

It should be noted that the example client device and server described herein above with respect to FIGS. 1-2 are merely examples utilized to illustrate various example embodiments, and that other client devices, servers, or both, may be equally utilized without departing from the scope of the disclosure.

FIG. 3 is an example schematic illustration of a remote direct memory access (RDMA) storage 300 according to an embodiment. The RDMA storage 300 includes a storage 310 and a network interface controller (NIC) 320.

The storage 310 may be, but is not limited to, a solid-state drive or other storage. The storage 310 may support, e.g., a logical device interface, for example the logical device interface of NVM Express (NVMe).

In an embodiment, the NIC 320 includes a memory 325. The memory may be volatile (e.g., RAM, etc.), non-volatile (e.g., ROM, flash memory, etc.), or a combination thereof. The memory 325 may include a first memory portion 327 and a second memory portion 329. The memory may store instructions that, when executed by the NIC 320, configures the NIC 320 to obtain a primary lock associated with a primary data block of the storage 310 when data is written to the first memory portion 327 (e.g., from a client device such as the client device 100, FIG. 1). To this end, the memory 325 further stores a plurality of locks, which may be stored in the memory 325 as, e.g., a fixed size data structure such as a hash table. Each lock may be, but is not limited to, a key utilized to access a corresponding portion of the storage 310.

In an embodiment, the memory 325 may further store instructions that, when executed by the NIC 320, configures the NIC 320 to determine a status of the primary lock associated with the first data block of the storage 310 when data is written to the second memory portion 329. If the primary lock is not in use, the NIC 320 may be configured to obtain the primary lock. If the primary lock is already in use, the NIC 320 may be further configured to send a response indicating the determined status of the primary lock (e.g., to the client device attempting to write to the memory 325).

In an embodiment, the memory 325 may also store a list of locking requests. In some embodiments, the list may be of a fixed size. In an embodiment, if the determined status indicates that the primary lock is in use, the request may be stored in the list. In a further embodiment, the NIC 320 may be further configured to determine the status of the first lock again after, e.g., a predetermined period of time, upon completing at least one other request, and the like. In another embodiment, the NIC 320 may be further configured to obtain a secondary lock associated with a secondary block of a secondary RDMA storage.

FIG. 4 is a network diagram 400 utilized to describe various disclosed embodiments. The network diagram 400 includes a plurality of client devices 100-1 through 100-N (hereinafter referred to individually as a client device 100 and collectively as client devices 100, merely for simplicity purposes), a plurality of servers 200-1 through 200-M (hereinafter referred to individually as a server 200 and collectively as servers 200, merely for simplicity purposes), and a network 410. 'N' and 'M' are integers each having a value equal to or greater than 1. The network 410 may be, but is not limited to, a wireless, cellular or wired network, a local area network (LAN), a wide area network (WAN), a metro area network (MAN), the Internet, the worldwide web (WWW), similar networks, and any combination thereof.

Each of the client devices 100 is configured to communicate over RDMA protocols with one or more of the servers 200 via the network 410 to send write requests including data to be stored in a RDMA storage (e.g., the RDMA storage 300, FIG. 3) of one of the servers 200.

Figure 5:
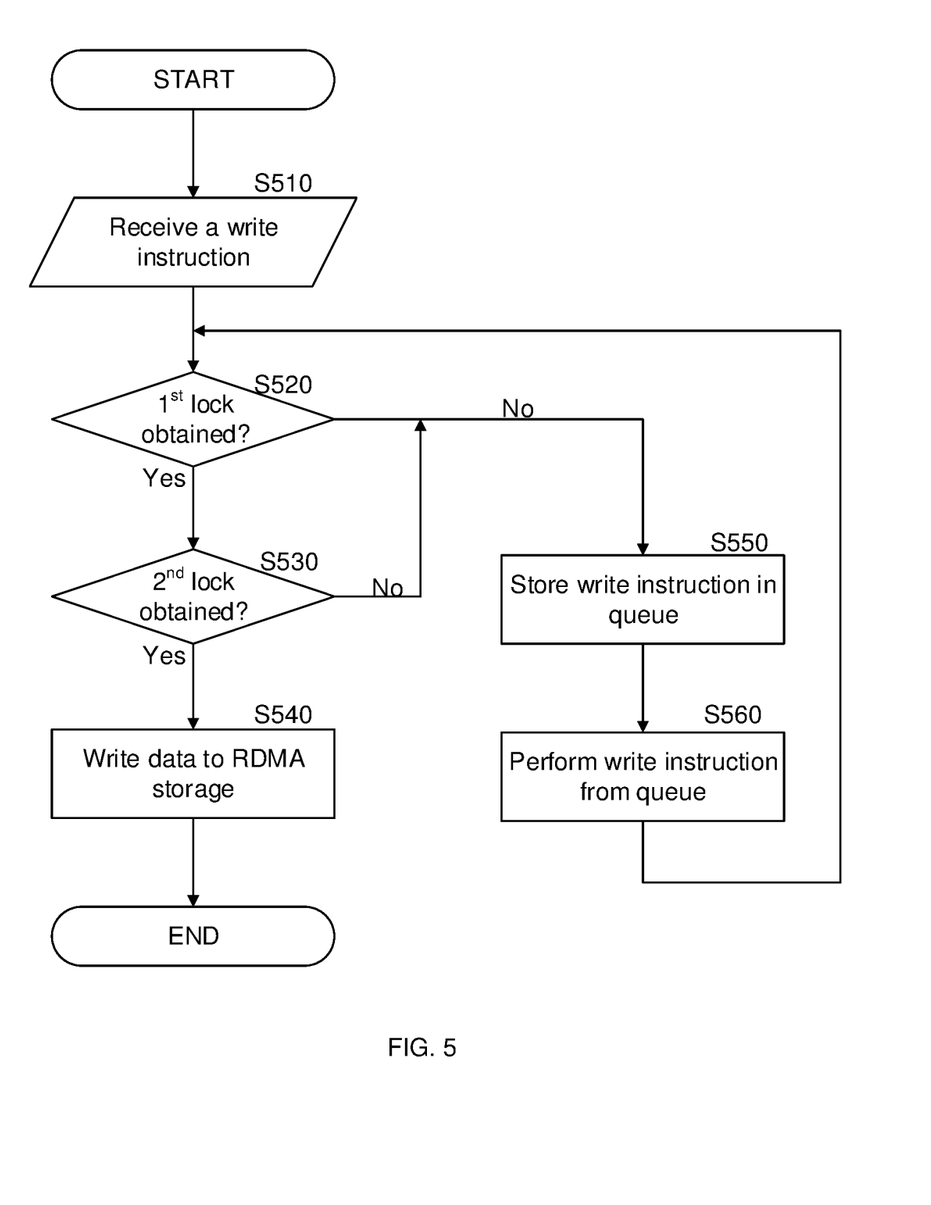
FIG. 5 is a flowchart illustrating a method for providing data redundancy via a storage having remote direct memory access storage according to an embodiment.

FIG. 5 is a flowchart 500 illustrating a method for providing data redundancy via a storage having remote direct memory access storage according to an embodiment. In an embodiment, the method is performed by the server 200, FIG. 2.

At S510, a write instruction is received. In an embodiment, the write instruction is received from a client device (e.g., the client device 100, FIG. 1). The write instruction includes data to be written to a primary RDMA storage including a plurality of data blocks, and indicates a primary block address corresponding to a designated primary data block of the data blocks of the primary RDMA storage. The designated primary data block is associated with a primary lock, and may be included in a first memory portion of a memory of the primary RDMA storage.

The primary RDMA storage may further include a plurality of segments, where each segment is a contiguous group of blocks of the plurality of blocks. One or more of the segments may be designated (e.g., in a list stored in the primary RDMA storage) as requiring high availability and, accordingly, redundancy, such that data written to a high availability segment of the primary RDMA storage should also be written to a corresponding portion of one or more of the secondary RDMA storages.

At S520, it is determined if the primary lock is obtained by the client device and, if so, execution continues with S530; otherwise, execution continues with S550.

At S530, when it is determined that the primary lock is obtained, it is determined whether at least one secondary lock is obtained and, if so, execution continues with S540; otherwise, execution continues with S550. In an embodiment, it is determined whether each secondary lock is obtained by the primary RDMA storage. In another embodiment, it is determined whether each secondary lock is obtained by the client device.

The at least one secondary lock may be obtained when, e.g., the primary block is included in a segment requiring high availability (e.g., when the segment is designated as requiring redundancy among a plurality of RDMA storages). Each secondary lock is associated with a secondary block address of a distinct secondary RDMA storage (e.g., the RDMA storage 230-2, FIG. 2). Each secondary block address corresponds to the primary block address. In an embodiment, a secondary RDMA storage may be a mirror, parity, or other redundancy of the primary RDMA storage, such that each secondary block of the secondary RDMA storage is redundant with respect to a corresponding primary block of the primary RDMA storage.

At S540, when it is determined that the at least one secondary lock is obtained, the data included in the write instruction is caused to be executed by the primary RDMA storage at the primary block address and execution terminates. In an embodiment, S540 further includes causing each secondary RDMA storage to execute the write instruction at a respective secondary block address of the secondary RDMA storage. Executing the write instructions only once both locks have been obtained ensures data integrity by preventing attempts to write data to the RDMA storages when one or more of the target data blocks is unavailable (e.g., the location in the primary RDMA storage or one of the secondary RDMA storages is occupied, one of the RDMA storages has failed, etc.).

At S550, when it is determined that the primary lock or the at least one secondary lock is not obtained, the received write instruction is stored in a queue. The queue is contained in a memory of a network interface controller of the primary RDMA storage. In an embodiment, S550 may further include sending a notification indicating that the primary lock or the at least one secondary lock was not obtained. In another embodiment, the queue may have a limited size in order to conserve memory usage. The queue may be configured as, e.g., a first-in first-out list.

At S560, the primary RDMA storage is configured to execute the write instruction stored in the queue and execution continues with S520. In an embodiment, S560 further includes configuring each secondary RDMA storage to execute the stored write instruction. In another embodiment, the primary RDMA storage may be configured to execute each write instruction stored in the queue, for example in first-in first-out order. In yet another embodiment, S560 may further include determining whether the primary lock and the at least one secondary lock have been obtained and, if so, configuring the RDMA storages to execute the respective write instructions; otherwise, execution may continue with other instructions stored in the queue until the primary lock and the at least one secondary lock are obtained.

In an embodiment, the write instruction may be revoked upon receiving a request from the client device to revoke the write instruction. In a further embodiment, the write instruction may be revoked when, e.g., the write instruction has not yet been executed, the write instruction is stored in the queue, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for providing data redundancy, comprising:
   receiving a write instruction, the write instruction including data to be written to a primary remote direct access (RDMA) storage and a primary block address corresponding to a designated primary block of the primary RDMA storage, wherein the designated primary block is associated with a primary lock stored in the primary RDMA storage;
   determining whether the primary lock and at least one secondary lock are obtained, wherein each secondary lock is associated with a secondary block of a distinct secondary RDMA storage; and
   writing the data included in the write instruction to the designated primary data block and each secondary data block associated with the obtained at least one secondary lock, when it is determined that the primary lock and the at least one secondary lock have been obtained, wherein the write instruction is executed only once both the primary lock and the at least one secondary lock have been obtained.

2. The method of claim 1, wherein the primary lock is of a plurality of primary locks stored in the primary RDMA storage, wherein the plurality of primary locks is stored in a fixed size data structure.

3. The method of claim 2, wherein the fixed size data structure is a hash table.

4. The method of claim 1, wherein the primary RDMA storage includes a network interface controller, the method further comprising:
   storing the received write instruction in a queue of the network interface controller, when it is determined that at least one of the primary lock and the at least one secondary lock has not been obtained.

5. The method of claim 4, further comprising:
   determining that the primary lock and the at least one secondary lock are obtained while the write instruction is stored in the queue; and
   upon determining that the primary lock and the at least one secondary lock are obtained while the write instruction is stored in the queue, writing the data included in the queued write instruction to the primary block and to the at least one secondary block.

6. The method of claim 1, wherein the write instruction is received from a client device, and wherein the primary lock is obtained by any of: the client device, and the primary RDMA storage.

7. The method of claim 6, wherein the at least one secondary lock is obtained by at least one of: the client device, and the primary RDMA storage.

8. The method of claim 7, wherein the at least one secondary lock is obtained by the primary RDMA storage, wherein the RDMA storage further stores a list of segments requiring high availability, each segment including a contiguous group of primary blocks of the plurality of primary blocks, wherein the at least one secondary lock is obtained when the designated primary block is in a segment requiring high availability.

9. The method of claim 1, wherein each of the primary RDMA storage and the at least one secondary RDMA storage is included in a server.

10. A non-transitory computer readable medium having stored thereon instructions for causing a processing circuitry to execute a process, the process comprising:
receiving a write instruction, the write instruction including data to be written to a primary remote direct access (RDMA) storage and a primary block address corresponding to a designated primary block of the primary RDMA storage, wherein the primary block is associated with a primary lock stored in the primary RDMA storage;
determining whether the primary lock and at least one secondary lock are obtained, wherein each secondary lock is associated with a secondary block of a distinct secondary RDMA storage; and
writing the data included in the write instruction to the designated primary block and each secondary block associated with the obtained at least one secondary lock, when it is determined that the primary lock and the at least one secondary lock have been obtained, wherein the write instruction is executed only once both the primary lock and the at least one secondary lock have been obtained.

11. A system for providing data redundancy, comprising:
a primary remote direct memory access (RDMA) storage, wherein the primary RDMA storage stores a plurality of primary blocks and a plurality of primary locks, wherein each primary lock is associated with at least one of the plurality of primary blocks;
at least one secondary RDMA storage, wherein each secondary RDMA storage stores a plurality of secondary blocks and a plurality of secondary locks, wherein each secondary lock is associated with at least one of the plurality of secondary blocks;
a processing circuitry; and
a memory, the memory containing instructions that, when executed by the processing circuitry, configure the system to:
receive a write instruction, the write instruction including data to be written to the primary RDMA storage and a primary block address corresponding to a designated primary block of the plurality of primary blocks;
determine whether the primary lock associated with the designated primary block and at least one secondary lock are obtained, wherein each secondary lock is associated with a secondary block of a distinct secondary RDMA storage of the at least one secondary RDMA storage; and
write the data included in the write instruction to the primary block and each secondary block associated with the obtained at least one secondary lock, when it is determined that the primary lock and the at least one secondary lock have been obtained, wherein the write instruction is executed only once both the primary lock and the at least one secondary lock have been obtained.

12. The system of claim 11, wherein the primary lock is of a plurality of primary locks stored in the primary RDMA storage, wherein the plurality of primary locks is stored in a fixed size data structure.

13. The system of claim 12, wherein the fixed size data structure is a hash table.

14. The system of claim 11, wherein the primary RDMA storage includes a network interface controller, wherein the system is further configured to:
storing the received write instruction in a queue of the network interface controller, when it is determined that at least one of the primary lock and the at least one secondary lock has not been obtained.

15. The system of claim 14, wherein the system is further configured to:
determine that the primary lock and the at least one secondary lock are obtained while the write instruction is stored in the queue; and
upon determining that the primary lock and the at least one secondary lock are obtained while the write instruction is stored in the queue, write the data included in the queued write instruction to the primary block and to the at least one secondary block.

16. The system of claim 11, wherein the write instruction is received from a client device, and wherein the primary lock is obtained by any of: the client device, and the primary RDMA storage.

17. The system of claim 16, wherein the at least one secondary lock is obtained by at least one of: the client device, and the primary RDMA storage.

18. The system of claim 17, wherein the at least one secondary lock is obtained by the primary RDMA storage, wherein the RDMA storage further stores a list of segments requiring high availability, each segment including a contiguous group of primary blocks of the plurality of primary blocks, wherein the at least one secondary lock is obtained when the designated primary block is in a segment requiring high availability.

19. The system of claim 11, wherein each of the primary RDMA storage and the at least one secondary RDMA storage is included in a server.

* * * * *